(12) United States Patent
Sardes et al.

(10) Patent No.: US 10,801,583 B2
(45) Date of Patent: Oct. 13, 2020

(54) DEVICE AND METHOD FOR TRANSFERRING ROTATIONAL POWER AND METHOD OF USING SAME

(71) Applicant: REE AUTOMOTIVE LTD., Tel-Aviv (IL)

(72) Inventors: Ahishay Sardes, Tel-Aviv (IL); Ran Dekel, Nofit (IL); Tomer Segev, Tel-Aviv (IL); Eran Starik, Tel Aviv-Jaffa (IL)

(73) Assignee: SOFTWHEEL LTD., Tel-Aviv (IL)

( * ) Notice: Subject to any disclaimer, the term of this patent is extended or adjusted under 35 U.S.C. 154(b) by 0 days.

(21) Appl. No.: 16/265,166

(22) Filed: Feb. 1, 2019

(65) Prior Publication Data

US 2020/0003277 A1 Jan. 2, 2020

Related U.S. Application Data

(60) Provisional application No. 62/692,788, filed on Jul. 1, 2018.

(51) Int. Cl.
*F16H 1/00* (2006.01)
*B60G 3/14* (2006.01)
(Continued)

(52) U.S. Cl.
CPC .............. *F16H 1/006* (2013.01); *B60G 3/14* (2013.01); *B60G 7/001* (2013.01); *B60K 17/043* (2013.01); *F16H 1/20* (2013.01); *F16H 1/22* (2013.01)

(58) Field of Classification Search
CPC ........................................................ F16H 1/006
See application file for complete search history.

(56) References Cited

U.S. PATENT DOCUMENTS 1,517,240 A * 12/1924 Albertson ................. F16D 3/18
74/16
3,191,452 A * 6/1965 Lipski ..................... F16H 1/006
74/384

(Continued)

FOREIGN PATENT DOCUMENTS

EP 2005030 12/2008

OTHER PUBLICATIONS

International Search Report of PCT Application No. PCT/IL2019/050724 dated Nov. 7, 2019.

*Primary Examiner* — Howard J Sanders
*Assistant Examiner* — Gregory T Prather
(74) *Attorney, Agent, or Firm* — Pearl Cohen Zedek Latzer Baratz LLP

(57) ABSTRACT

Device and method for providing rotational power using power transmission are disclosed. The device enables multi-dimensional and angle-agnostic displacement of the rotational power output with respect to the input location and transference of high-torque and high-speed rotational movement, while preserving maximal efficiency and quick response. The device is a transmission gear that comprises at least two gear-links in a multi-link articulated gear (MLAG). Each of the links comprising at least two gear wheels. The transmission gear further comprising a common axis adapted to allow the links to rotate freely with respect to each other about the common axis and thus to allow change of the angle between the at least two links and thereby to change the distance between the input shaft and the output shaft.

10 Claims, 16 Drawing Sheets

(51) Int. Cl.
  *F16H 1/20* (2006.01)
  *F16H 1/22* (2006.01)
  *B60G 7/00* (2006.01)
  *B60K 17/04* (2006.01)

(56) References Cited

U.S. PATENT DOCUMENTS

| | | | |
|---|---|---|---|
| 3,397,589 A * | 8/1968 | Moore | F16H 1/22 |
| | | | 74/397 |
| 3,426,610 A * | 2/1969 | Scharer | F16H 3/001 |
| | | | 74/397 |
| 4,180,222 A | 12/1979 | Thornburg | |
| 4,353,677 A * | 10/1982 | Susnjara | B05B 13/0431 |
| | | | 414/4 |
| 5,784,542 A | 7/1998 | Ohm et al. | |
| 6,105,710 A | 8/2000 | Vandepitte | |
| 7,009,350 B1 | 3/2006 | Gold | |
| 2015/0211478 A1 | 7/2015 | Dragic | |
| 2017/0120748 A1* | 5/2017 | Bandy | B60K 5/02 |
| 2019/0048976 A1* | 2/2019 | Armstrong | E21B 23/14 |

* cited by examiner

Fig. 2B – Front View

Fig. 2B – Top View-1

Fig. 2B – Top View-2

DEVICE AND METHOD FOR TRANSFERRING ROTATIONAL POWER AND METHOD OF USING SAME

CROSS-REFERENCE TO RELATED APPLICATIONS

This application claims the benefit of U.S. Provisional Pat. App. No. 62/692,722, filed on Jul. 1, 2018, which is incorporated herein by reference in its entirety.

BACKGROUND OF THE INVENTION

Mechanical gears for transferring rotational power between an input shaft and an output(s) shaft are usually used for one or more of the following purposes: setting a desired transfer ratio, changing the relative orientation, location and direction of the shaft between the spatial orientation of the input and the output axes (e.g., a 90-degrees helical gear), providing power transmission having one direction of power transmission (e.g., 90 degrees helical gears), and the like. In all of these applications, the distance and orientation between the input axis and the output axis are fixed.

Reference is made to FIGS. 1A and 1B, which are schematic illustrations of a parallel gearbox 10, with an input shaft 12 and output shaft 14 having a transfer ratio of 1:n. In gearbox 10, axes 12 and 14 are parallel, and the relative direction of rotation may be similar or opposite, depending on the specific layout of the gearbox. In gearbox 20, input shaft 22 and output shaft 24 are oriented in a perpendicular manner with respect to each other.

There is need for gears that enable transferring power from an input shaft to an output shaft in a desired transfer ratio, in an efficient and immediate manner.

SUMMARY OF THE INVENTION

Gears that enable transferring of power from an input shaft to an output shaft in a desired transfer ratio, in an efficient and immediate manner, are presented. The transference is indifferent to the distance and angle between them and is able to change in an instantaneous manner, according to their intended use, all while retaining compact and narrow dimensions permitting as much design freedom as possible. For example, when a gear is driving an apparatus of some sort, it is sometimes required to enable sufficient movement—in both displacement and angle—between the input (rotational power source such as a motor) and the rotational power load (e.g., a wheel), to enable the kinematics of the system the freedom needed to perform its purpose, e.g., allowing a suspended wheel to follow the changing curvature of the road/track on which it rolls.

A device and method for power transmission are disclosed, allowing multi-dimensional, angle-agnostic, displacement and transference of high-torque and high-speed rotational movement, while preserving maximal efficiency and quick response, for various purposes or vehicles.

In the following description, transmission gearboxes are described that comprise at least two elements. Each such element is a sub-transmission gearbox which comprises at least two gear wheels engaged with one another. All such elements are connected to each-other by a common shaft that allows them to rotate about that shaft and, by that, to change their relative angles. Further, these elements are engaged with each other such that rotational movement of the gear wheels one causes the gear wheels of the other to rotate. Each such element is called hereinafter an articulated link, or simply link.

According to some embodiments, a transmission gear is disclosed comprising at least two links in a multi-link articulated gear (MLAG), each comprising at least two gears configured to transfer rotation from one gear to the other gear and to rotate freely, wherein a first gear in a first link in the MLAG is adapted to be powered by a rotational power source provided to an input shaft and a second gear is adapted to rotate, or to serve as a first gear of a second link from the at least two links. The transmission gear further comprises a common axis adapted to allow the links to rotate freely about the common axis and thus to allow change of the angle between the at least two links and thereby to change the distance between the input shaft and the output shaft.

According to some embodiments, the gears of the first link and of the second link are positioned in a substantially the same plane.

According to some embodiments, the gears of the first link are positioned in a plane that is substantially parallel to the plane of the gears of the second link and displaced from it. According to some embodiments, the second gear of the first link and the first gear of the second link are configured to rotate together on a common axis.

According to some embodiments, the second gear of the first link is the first gear of the second link.

According to some embodiments, the transmission gear further comprises at least one additional link.

According to some embodiments, the transmission gear further comprises at least one additional link, each of the at least one additional link comprises one or two gears adapted to rotate freely, wherein the first gear of a given link is adapted to be rotated by the second gear of the previous or the following link from one or more links, and wherein each of said links is adapted to rotate about a common axis with a neighbor link.

A wheel driving mechanism is disclosed comprising a transmission gear as described above, a rotational power source coupled to the first gear of the first articulated link, a wheel coupled to the second gear of the second articulated link and a suspension mechanism coupled between the first articulated link and the second articulated link to provide suspension between the rotational power source and the wheel.

A wheel driving mechanism is disclosed comprising a transmission gear according to multiple articulated links as described above, further comprising a rotational power source coupled to the first gear of the first articulated link, a wheel coupled to the second gear of the second articulated link and a suspension mechanism coupled between the first articulated link and the second articulated link to provide suspension between the rotational power source and the wheel.

According to some embodiments, a method is disclosed for minimizing the total torque exerted on a multi-gear transmission gearbox when powered at its input shaft. The method comprises providing rotational power to a first gear wheel in the multi-gear transmission gearbox that comprises at least three gear wheels, the gear wheels being arranged to transfer the rotational power from a first gear wheel to the second gear wheel and from the second gear wheel to a third gear wheel, so that all odd numbered gear wheels turn in the same direction and setting the output gear wheel to be an odd-numbered gear wheel from the first gear wheel. In some embodiments, the output gear wheel is one from the third, the fifth or the seventh gear wheel from the first gear wheel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
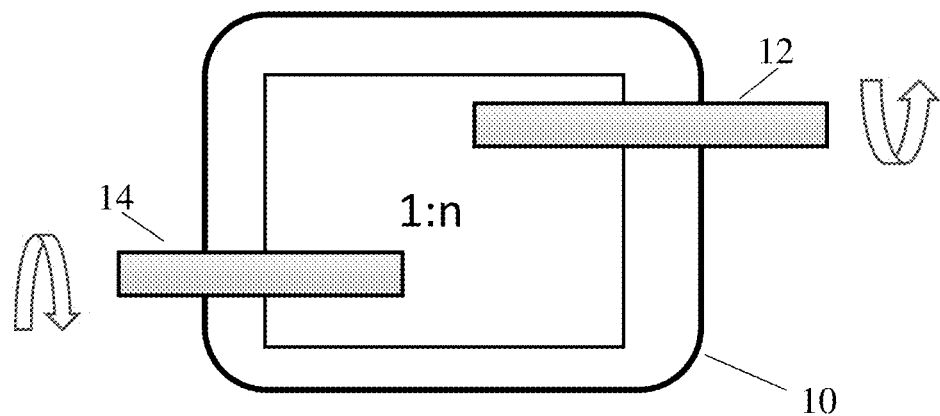
FIGS. 1A and 1B are schematic illustrations of two types of transmission gearboxes, as known in the art.
Figure 1B:
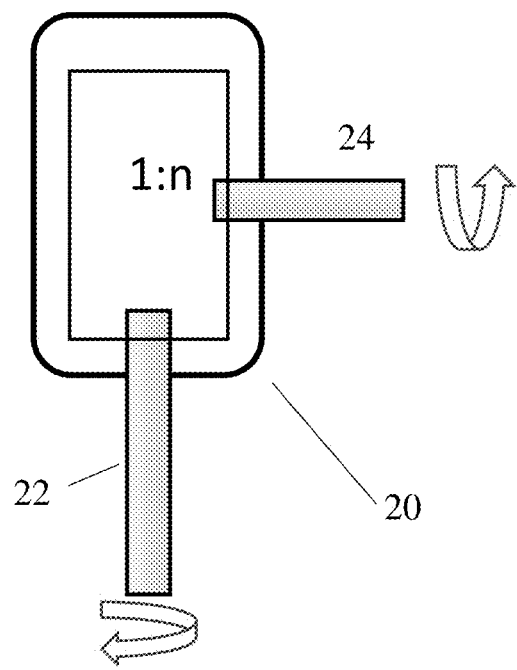

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. The terms axis, axle, pivot, shaft, hinge and so on, as used in the description of embodiments of the invention herein below, refer to like articles and may be used interchangeably.

According to some embodiments of the present invention, in order to enable movement of an output shaft with respect to an input shaft, two or more links in a multi-link articulated gear (MLAG) may be pivotally connected to each other, each link may comprise at least two gears meshed with each other, where one of the gears may be part of both links. It will be noted that, throughout the description of embodiments of this invention, the term "link" or "link of MLAG" (hereinafter L-MLAG) refers to any mechanical joint that fixedly connects two rotation axes to one another so that the axes are parallel to each other and are distanced so that gears that are rotating about the axes may drive (i.e., rotate) each-other, for example in the form of meshed gears, in the form of chain drive, in the form of drive belt, hydraulic, magnetic, or any other power transference method. Additionally, at least one axis of the link (L-MLAG) may serve also as a pivot enabling one L-MLAG to rotate (or swivel) about this axis, thereby changing the relative angle between the lines in each L-MLAG that connect two adjacent axes. In some embodiments, two neighbor L-MLAGs may be pivoted as described above so that their gears are disposed in a substantially same plane, and in some embodiments, the gears of one L-MLAG are disposed in a plane different from that of the neighbor L-MLAG. In all of the embodiments described hereinbelow, rotation movement originating by a gear in one L-MLAG is transferred to a neighbor gear in the neighbor L-MLAG, which then its rotation is transferred to the other gear in the same L-MLAG.

Each L-MLAG may comprise a supporting structure and two or more gears. The supporting structure is made to support, e.g., by means of pivots (or axes) each of the gears and to allow them to freely rotate while geared with each other. Each two neighboring L-MLAGs share a common axis that functions both as rotation axis for a common gear and as an axis for changing the relative angle between the two neighboring L-MLAGs.

Figure 2A:
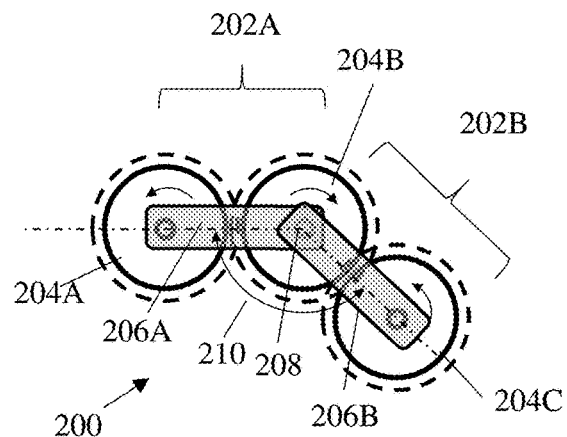
FIG. 2A depicts schematic illustration of a transmission gearbox with two articulated links, according to some embodiments of the present invention.

Reference is made to FIG. 2A, which depicts a schematic illustration of multi-link articulated gearbox (MLAG) 200 with two articulated links (L-MLAGs), according to some embodiments of the present invention. MLAG 200 comprises first L-MLAG 202A and second L-MLAG 202B. First L-MLAG 202A comprises external gear 204A and internal gear 204B. Second L-MLAG 202B comprises same internal gear 204B and external gear 204C. Since the three gears are meshed with each other, when gear 204A is powered (turned or rotated), as is depicted by its respective arrow, it causes gears 204B and 204C to rotate with it, each about its respective axis, while the respective L-MLAGs may remain stationary or move independently. L-MLAG 202A and L-MLAG 202B share a common axis 208, which is also the axis of rotation of gear 204B. L-MLAGs 202A and 202B are connected via common axis 208 so that their relative angle 210 may be changed by rotating either of the L-MLAGs about axis 208. As seen in FIG. 2A, axis 208 may allow gear 204B to rotate independently of the rotation of either L-MLAG 202A or 202B about axis 208. Accordingly, rotational power may be provided to, for example, input gear 204A and may be continuously transferred to output gear 204C, and the relative angle between L-MLAG 202A and L-MLAG 202B may change independently of the rotation of the gears. As a result, rotational power may be transferred from input gear 204A to output gear 204C while the distance between their axes may be changed, by means of change of the relative angle between L-MLAG 202A and 202B, independently of the rotation of the gears. It is to be understood that the way one L-MLAG may be rotated about a common axis with respect to a neighbor L-MLAG applies also to the way it may rotate about an axis connected to a reference frame, with respect to the reference frame.

Figure 2B:
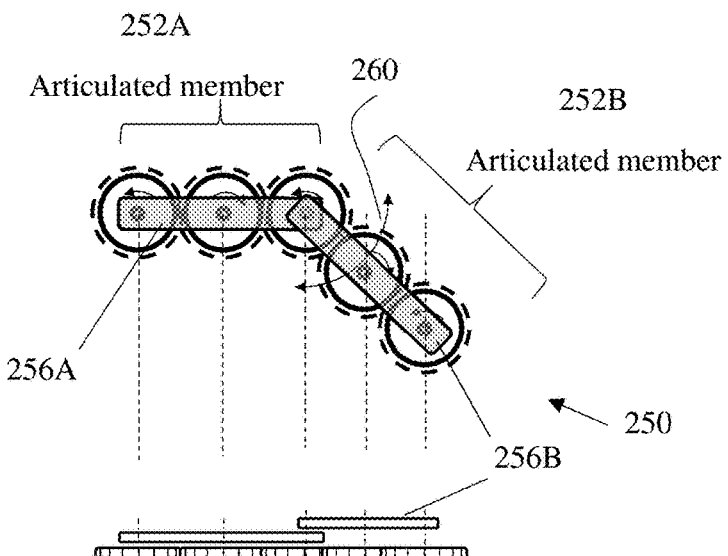
FIG. 2B depicts front view and two top views of a transmission gearbox according to some embodiments of the present invention.
Figure 2B:
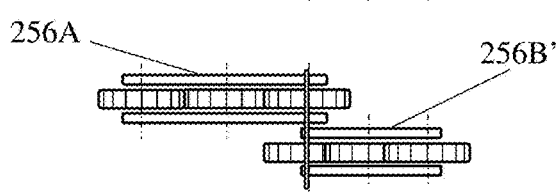
Figure 2B:
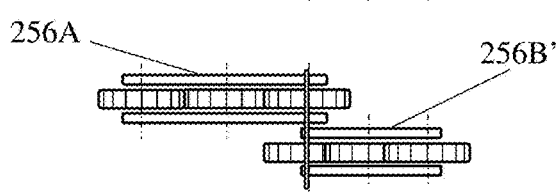

Reference is made now to FIG. 2B, which depicts the front view and two top views of a MLAG 250 according to some embodiments of the present invention. Basically, MLAG 250 operates similarly to MLAG 200 of FIG. 2A, yet each of its L-MLAGs, 252A and 252B, comprises three gears, with one gear common for the two L-MLAGs. L-MLAG 252B may change its relative angle to L-MLAG 252A as depicted by arrow 260.

Top view-1 and top view-2 of FIG. 2B exemplify two different optional embodiments of MLAG 250. In Top view-1, all of the gears of MLAG 250 are assembled and allowed to rotate, in a substantially common plane. In Top view-2, gears of L-MLAG 252A rotate in one plane, and gears of L-MLAG 252B rotate in a different plane that is substantially parallel to the plane of L-MLAG 252A. In the embodiment shown in top view-2, L-MLAG 252A and L-MLAG 252B do not share a common gear, but they each comprise a gear that shares a common rotation axis with one another, thereby they rotate together. The shared common rotation axis is also the axis of rotation of one L-MLAG with respect to a neighbor L-MLAG, Accordingly, the general description of a MLAG, according to some embodiments of the present invention, may be: a transmission gear comprising two or more articulated gear assemblies that may be pivotally connected to each other, each articulated gear assembly may comprise at least two gears geared with each other, where one of the gears of each articulated gear assemblies rotates together on a common axis with one of the gears of the other articulated gear assembly.

Figure 3A:
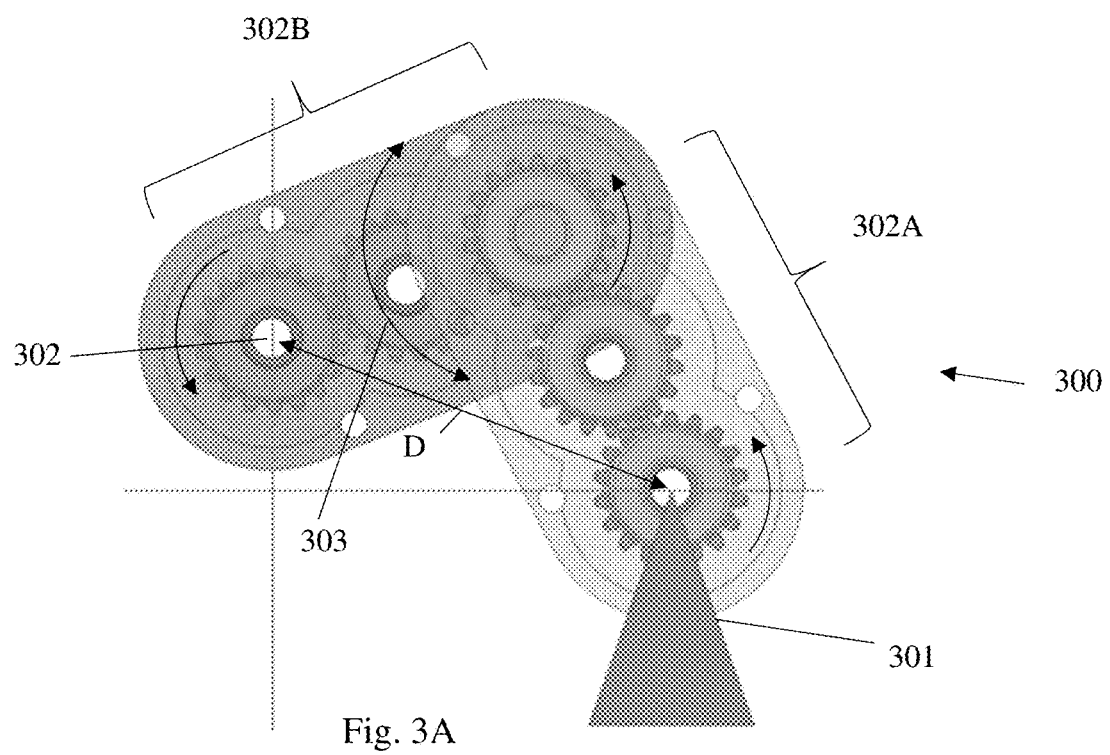
FIGS. 3A and 3B depict a side view and an isometric view, respectively, of a transmission gearbox according to an embodiment of the present invention.
Figure 3B:
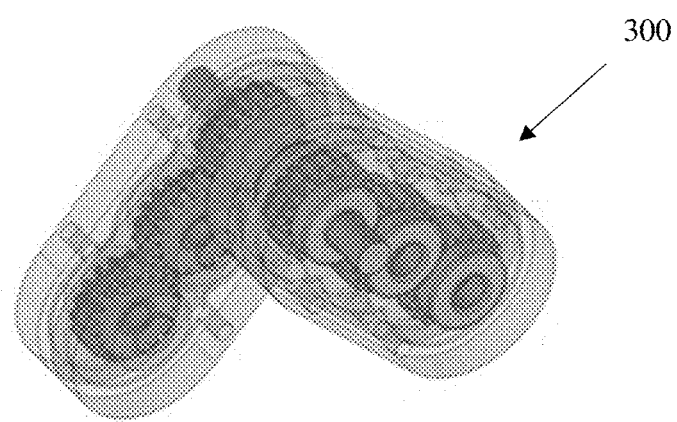

Reference is made now to FIGS. 3A and 3B, which depict a side view and an isometric view, respectively, of multi-link articulated gearbox (MLAG) 300 according to some embodiments of the present invention. MLAG 300 depicts two L-MLAGs structured in an out-of-collinearity position of the L-MLAGs (similar to the embodiment depicted in FIG. 2B, top-view-2). When MLAG 300 is connected at one end to a static point 301, the other end 302 may change its distance D from point 301 as depicted by angular arrow 303.

In case there is need (or will) to locate the output gear of MLAG 300 in a different plane than that of the input gear, the structure depicted clearly in FIG. 3B may be used.

Figure 4A:
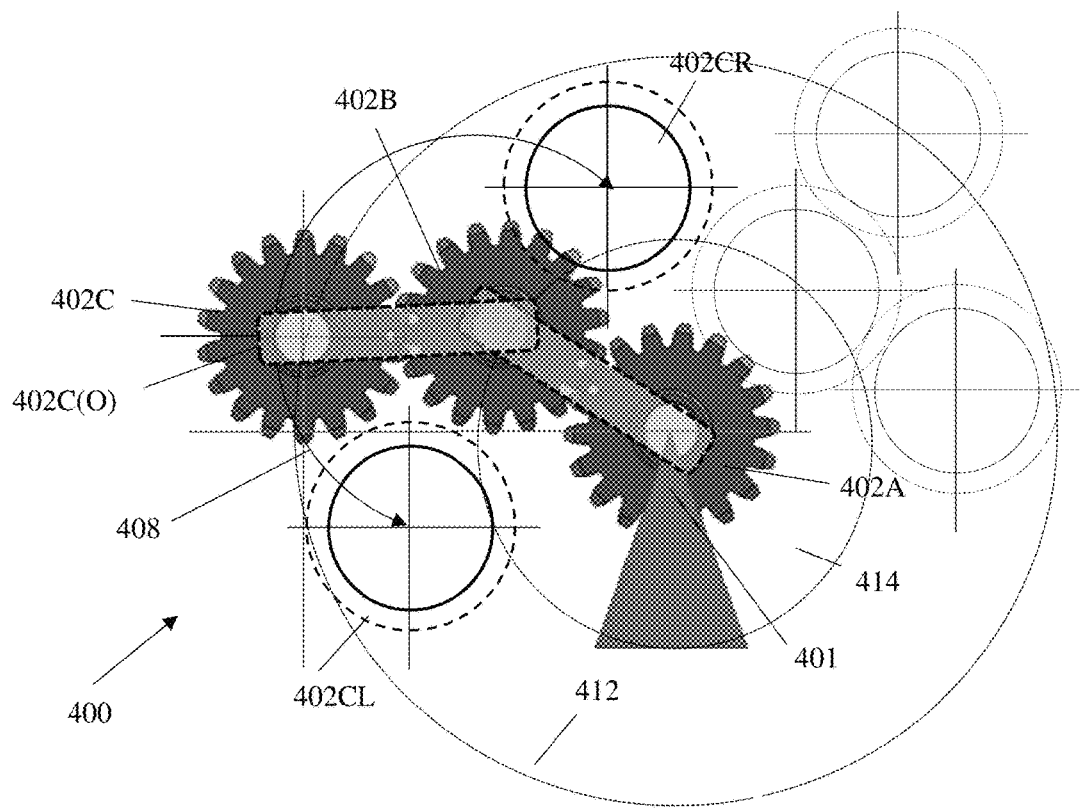
FIGS. 4A and 4B depict side view and isometric view of another type of a transmission gearbox according to an embodiment of the present invention.
Figure 4B:
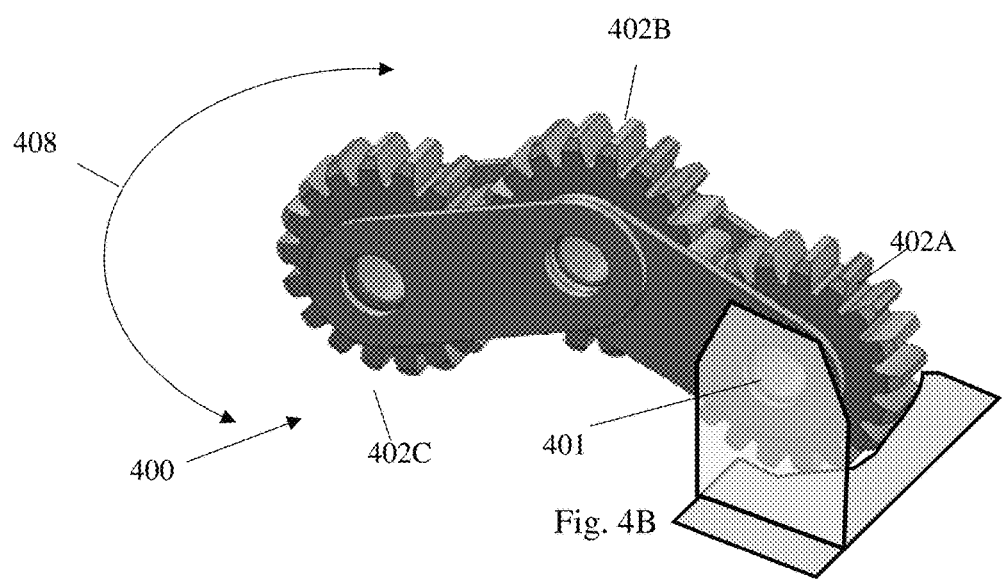

Reference is made now also to FIGS. 4A and 4B which depict the side and isometric views of another type of multi-link articulated gearbox (MLAG) 400 according to an embodiment of the present invention. In FIG. 4A, the structural portions of the L-MLAGs are presented semi-transparent for improved clarity of the drawing, yet it would be apparent that gears 402A, 402B and 402C are geared in a common plane and are supported as explained, for example, with respect to MLAG 200 of FIG. 2A. Assuming that gear 402A is connected to a static point 401, an exemplary range of movement of gear 402C is exemplified by arrow 408, showing an optional range of movement between one end 402CL to another end 402CR.

Circles 412 and 414 in FIG. 4A represent the external and internal boundaries, respectively, of the optional geometric places of the center 402C(O) of gear 402C around static point 401, where the radius of circle 412 is given when all three gears are located along one radial, and the radius of circle 414 is obtained when gear 402C almost touches gear 402A.

Figure 5:
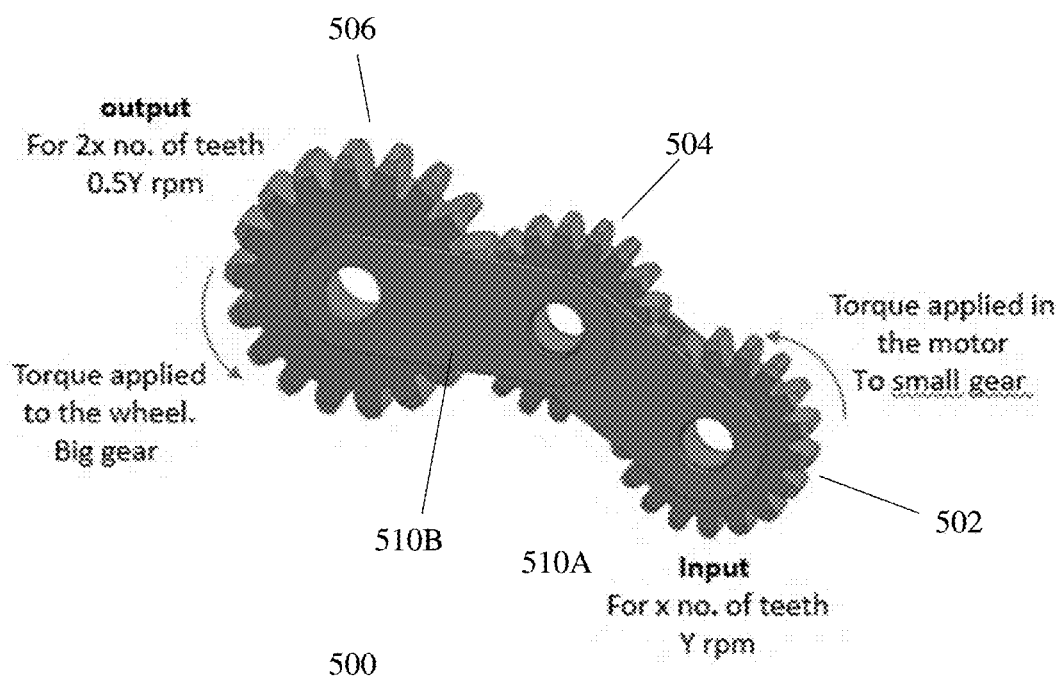
FIG. 5 depicts a transmission gearbox with 1:n (n≠ or =1) transmission ratio, according to an embodiment of the present invention.

Reference is made now to FIG. 5, which depicts multi-link articulated gearbox (MLAG) 500 with 1:n (n≠ or =1) transmission ratio, according to an embodiment of the present invention. In cases when, additionally to a solution for transforming rotational power via a gear assembly that allows also changing of the distance between its input and output axes, it is needed to change the transmission ratio from 1:1 (as in the examples of FIGS. 2A, 2B, 3A, 3B, 4A and 4B) to another transmission ratio, the basic structure of a MLAG according to some embodiments of the invention may be used for this purpose. As seen in FIG. 5, rotational power may be provided to gear 502, which rotates gear 504 (the common gear in MLAG 500) which then rotates gear 506—the output gear. While gears 502 and 504 may have an inter transmission ratio of 1:1 (having the same number of teeth), gear 506 may have a number of teeth different than that of gear 504—larger in the example of FIG. 5. In this case the output L-MLAG 510B, comprising gears 504 and 506, functions as a step-down transmission stage.

Figure 6:
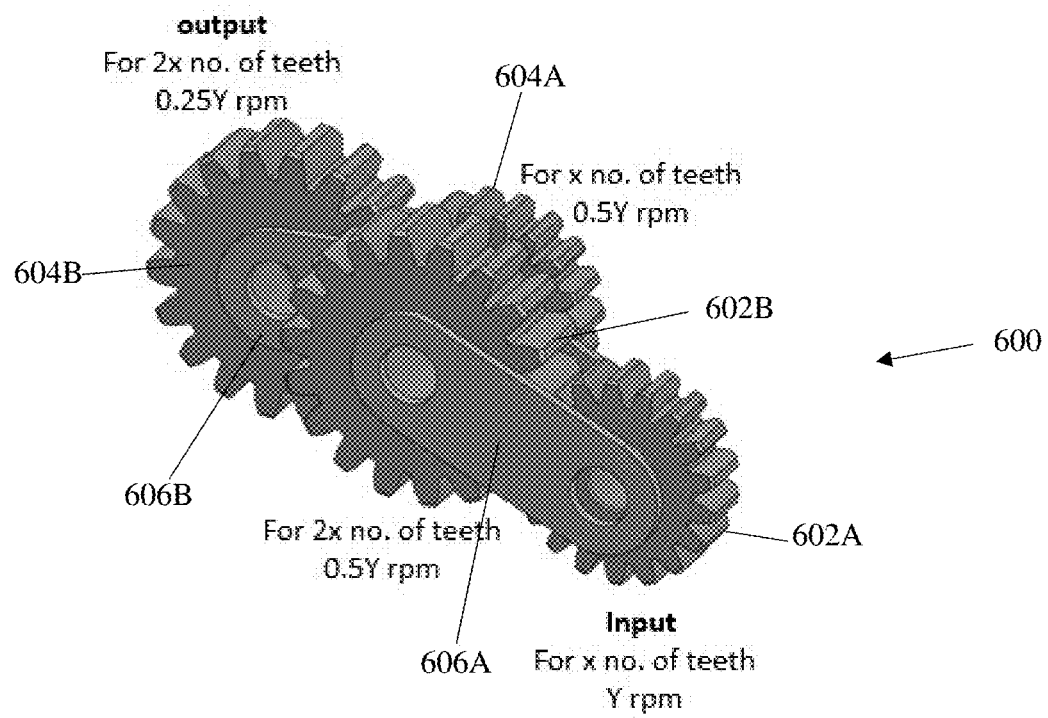
FIG. 6 depicts an additional transmission gearbox with 1:n (n≠ or =1) transmission ratio, according to an embodiment of the present invention.

Reference is made now to FIG. 6, which schematically depicts multi-link articulated gearbox (MLAG) 600 with 1:n (n≠ or =1) transmission ratio, according to an additional embodiment of the present invention. MLAG 600 may have two L-MLAG s-606A and 606B. Each of the L-MLAG s comprises, in the example of FIG. 6, two gears. L-MLAG 606A comprises gears 602A and 602B, with a stepdown ratio of 1:2 (gear 602B has twice as many teeth). L-MLAG 606B comprises gears 604A and 604B, with a stepdown ratio of 1:2 (gear 602B has twice as many teeth). Gears 602B and 604A rotate together around a common axis. Accordingly, the accumulated effect of rotational speed reduction in this example is a step-down of 1:4 (output rotation speed is 0.25 of the input rotation speed).

Figure 7:
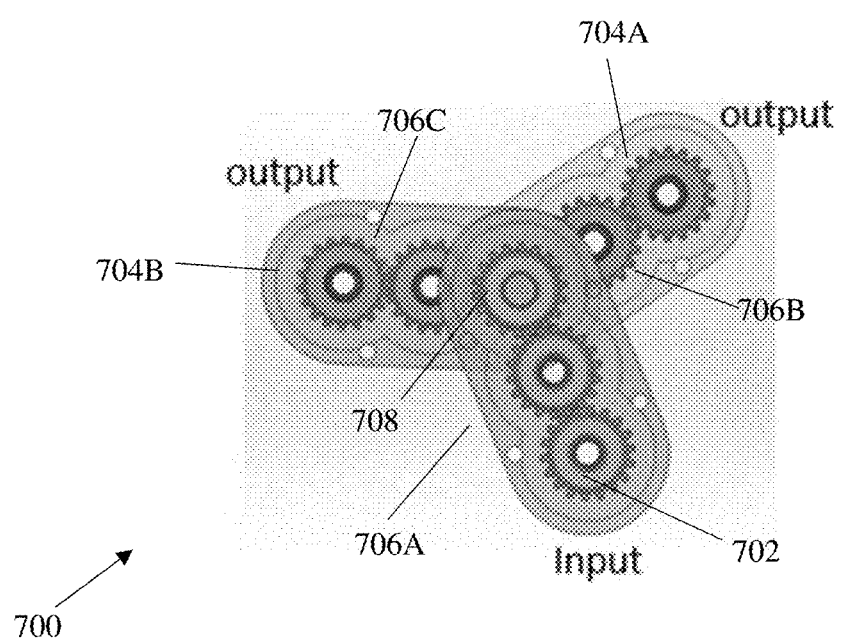
FIG. 7 depicts a transmission gearbox with multiple outputs, according to an embodiment of the present invention.

Reference is made now to FIG. 7, which depicts multi-link articulated gearbox (MLAG) 700 with multiple outputs, according to an embodiment of the present invention. MLAG 700 comprises one input L-MLAG 706A and two L-MLAGs (AAs) 706B and 706C. Each L-MLAG comprises two gears and the three L-MLAGs share one central axis of rotation 708 through which rotational power from gear 702 is transferred to output gears 704A and 704B. Additionally, L-MLAGs 706B and 706C may change their relative angles to L-MLAG 706A by freely rotating about axis 708. In the example of FIG. 7, the transmission ratio from input gear 702 to output gears 704A and 704B is 1:1; however, it will be apparent to those skilled in the art that other transmission ratios may be embodied.

Figure 8:
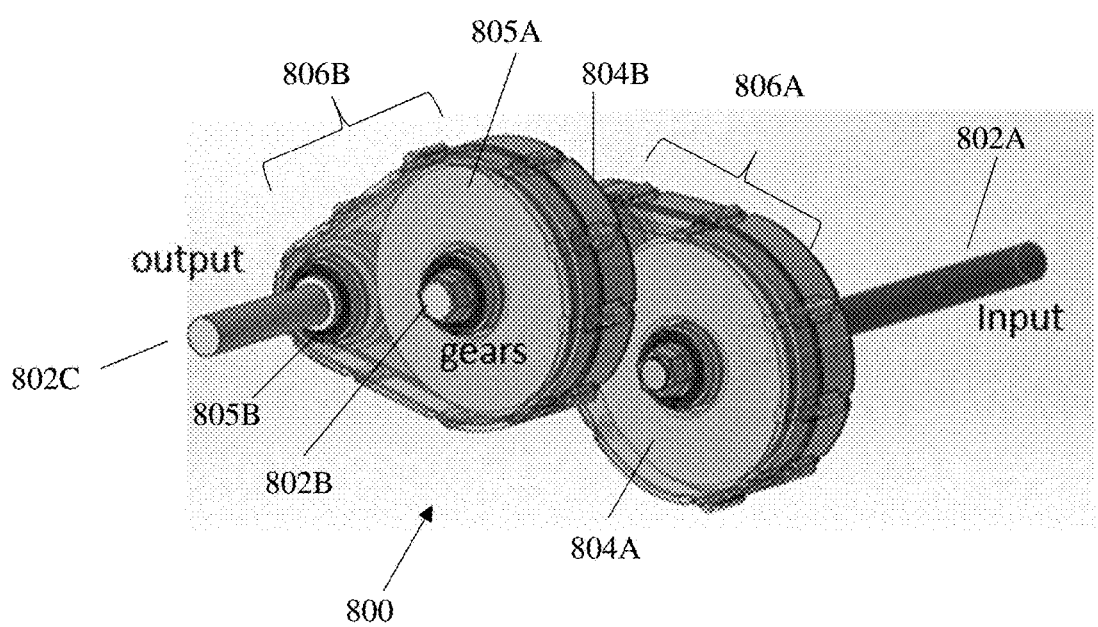
FIG. 8 depicts a transmission gearbox with multiple stages of speed reduction, according to an embodiment of the present invention.

Reference is made now to FIG. 8, which depicts multi-link articulated gearbox (MLAG) 800 with multiple stages of speed reduction, according to an embodiment of the present invention. MLAG 800 may comprise two (or more) L-MLAGs 806A and 806B which embody the basic operation of a MLAG with changeable distance between its input and output axes, and additionally it may employ rotational speed reduction/increasing gears embedded therein. As depicted in FIG. 8, input axis 802A may be the input axis for a speed reduction gear 804A, where the external circumference of the gear is its output. External circumference of gear 804A may drive axis 802B, which is the central axis of MLAG 800, via gear/belt wheel 804B. Axis 802B may be the input axis of reduction gear 805A (that may be, in some embodiments, similar to reduction gear 804A). Reduction gear 805A may transfer power by means of a transmission belt from its external circumference to output gear/belt wheel 805B, thereby delivering rotational power to output axis 802C. MLAG 800 exemplifies combination of a basic MLAG as described above with respect to FIGS. 2A, 2b, 3A, 3B, etc., with two stages of rotational speed reduction using reduction gears 804A and 805A.

Figure 8A:
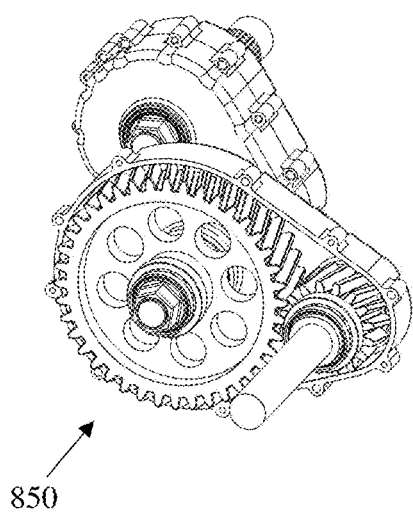
FIGS. 8A-8C depict three different embodiments of transmission gears according to some embodiments of the present invention.
Figure 8B:
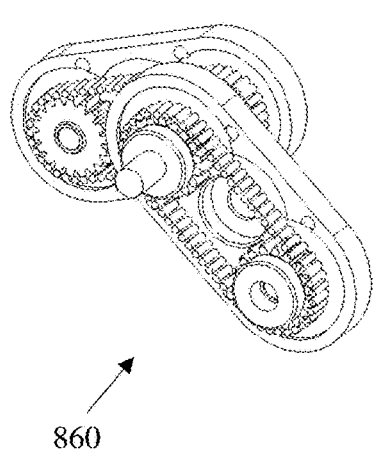
Figure 8C:
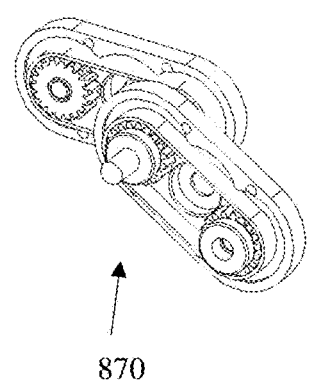

Reference is made now also to FIGS. 8A-8C. FIGS. 8A, 8B and 8C depict, respectively, MLAG 850 embodied with meshed gears, MLAG 860 embodied with chain wheel and drive chains, and MLAG 870 embodied with belt wheels and drive belts, according to some embodiments of the present invention. Each one of MLAG 850, 860 and 870 is operable according to the principles described above, with respect to MLAG 400 (FIG. 4), MLAG 500 (FIG. 5), MLAG 600 (FIG. 6) and MLAG 800 (FIG. 8), with the necessary changes.

According to some embodiments of the invention that were described above, the following are features that may be realized using a multi-link articulated gearbox (MLAG) of the invention:

- Joining two units of rotating equipment so that rotational power is efficiently and immediately transferred from one unit to the other unit while allowing three-dimensional (six degrees of freedom) motion of one shaft, e.g., the output shaft, relative to the second, e.g., the input shaft, where the axis of rotation is perpendicular, or close to perpendicular, to the plane of rotation.
- Allowing steep angle of motion between input and output, i.e., large movement in one direction while keeping a slim or wide profile on other directions, to save volume occupied or bridge gaps, e.g., if the slim profile allows large travel and free low-resistance movement along the plane perpendicular to rotating shafts while minimizing distance in the direction of the shaft.
- Enabling easy and simple integration of a clutch mechanism.
- Enabling easy and simple integration of rotational speed reduction/increasing gear(s).
- Supporting transfer of high torque, high rotational speeds and high power, efficiently.
- Providing simple and free-standing system that does not require control or complicated subsystems (electronics, oil pump or other control apparatus) enabling transference of the power in a reliable manner.
- Supporting two-way (forward and backward) power transfer through the system.

In some embodiments, a transmission gear constructed and operating according to the description above may be used, for example, for providing simple and reliable driving system for wheels traveling along bumpy road, by providing, by means of a multi-link articulated gearbox (MLAG) of the invention, rotational power to an input axis that is static with respect to the traveling vehicle and transferring the rotational power to a wheel following the bumpy road (and therefore dynamic with respect to the travelling vehicle).

Figure 9A:
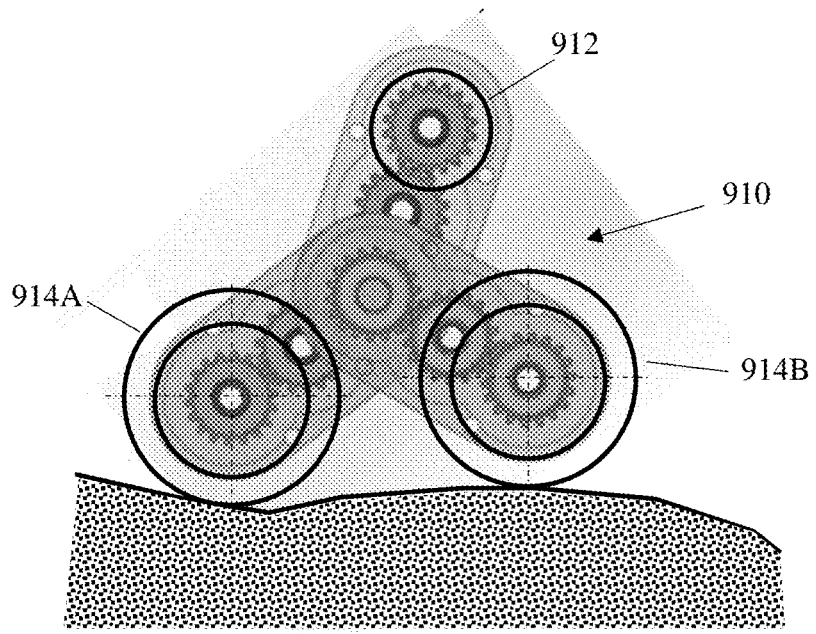
FIG. 9A depicts an exemplary use of transmission gearbox of FIG. 7, according to an embodiment of the present invention.
Figure 9B:
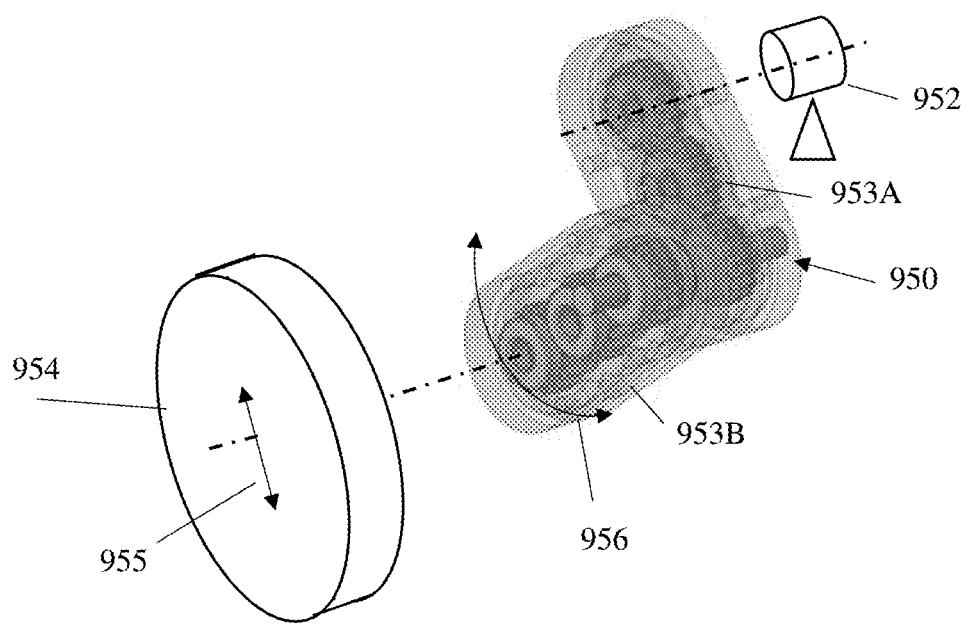
FIG. 9B depicts exemplary use of transmission gearbox of FIG. 3B, according to an embodiment of the present invention.

Reference is made to FIGS. 9A and 9B, which depict exemplary use of multi-link articulated gearbox (MLAG)s 700 of FIG. 7 and 300 of FIG. 3B, respectively, according to an embodiment of the present invention. FIG. 9A depicts multi-link articulated gearbox (MLAG) 910 that is powered via input shaft by a motor 912. MLAG 910 powers wheels 914A and 914B, via their respective output shafts, as described above with respect to FIG. 7. Damping elements that are usually installed between the output L-MLAG s of MLAG 910, as is known in the art, are not drawn, in order to not obscure the drawing. It is to be assumed that proper springy force is applied onto the output L-MLAG s to ensure good attachment of the wheels to the road. As seen in the drawing, each of wheels 914A and 914B may independently follow the bumps of the road without effecting its rotational powering. This embodiment may be extended to any number of L-MLAGs, for various purpose vehicles (e.g., 6×6 or 8×8 all-terrain vehicles).

In a similar manner, in FIG. 9B MLAG 950, similar to MLAG 300 of FIG. 3B, may be used to provide rotational power from motor (or other rotational power source) 952 via first L-MLAG 953A and second L-MLAG 953B to wheel 954. The freedom of second L-MLAG 953B to move as indicated by arrow 956, while the motor 952 is static with respect to the vehicle chassis, allows wheel 954 to move as indicated by arrow 955, for example when following bumps on a road.

Figure 10:
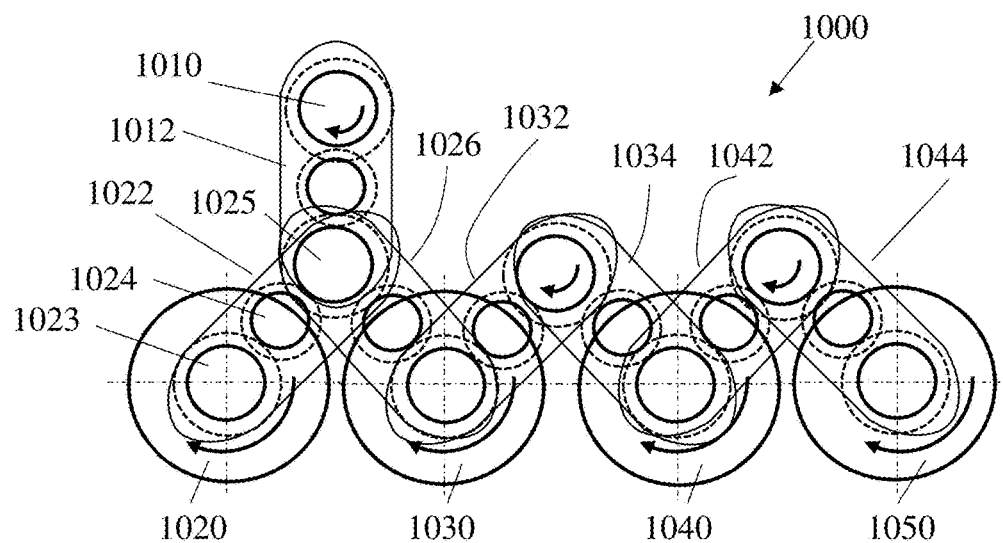
FIG. 10 is a schematic illustration of a multi-wheel suspension powered according to some embodiments of the present invention.

Reference is made now to FIG. 10, which is a schematic illustration of a multi-wheel suspension 1000, powered according to some embodiments of the present invention. Multi-wheel suspension 1000 may have each, or at least some of its wheels 1020, 1030, 1040 and 1050 be powered by rotation power source provided at cog wheel 1010, similarly to the way wheels 914A and 914B (FIG. 9A) are powered by rotational power source cog wheel 912. The difference here is the use of multiple "daisy-chain" rotational power transmissions 1032, 1034, 1042 and 1044 that chain the rotational power from wheel 1030 to wheels 1040 and to wheel 1050. It will be apparent that the type of power transmission from a wheel to its neighbor wheel should not necessary be carried out by chains of cog wheel. For example, it may be performed using chain wheels and chains. Further, transmissions boxes are drawn schematically, to minimize obscuring of the drawings. Any known type of transmission gearbox may be used. Additionally, lubrication solutions may be of any known type, designed to provide the required lubrication and heat dissipation, according to the specifics of the transmission unit. In some embodiments suspension 1000 may have its wheels 1020-1050 adapted to role directly on the travel surface. In other embodiments a chain may be further used, wrapping around the wheels, or some of the wheels, to strengthen friction with the surface.

A transmission gear (TG) such as TG 300 (FIG. 3) or TG 400 (FIG. 4) and the like will be referred to in the examples of some embodiments below generally 'multi-link transmission unit' (MLTU).

Figure 11A:
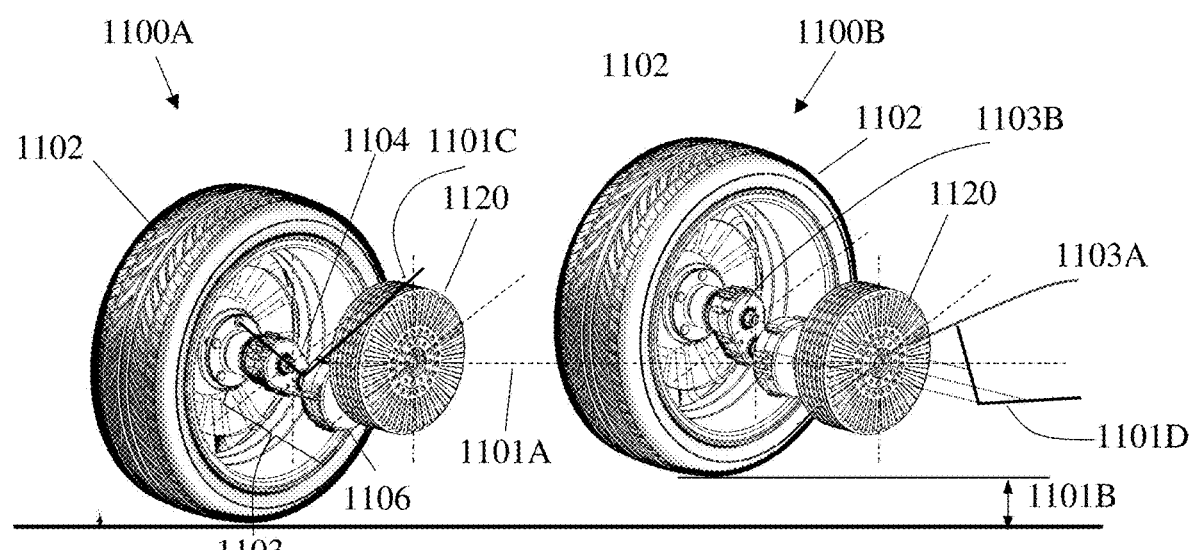
FIGS. 11A and 11B are schematic illustrations of an in-wheel multi-link transmission unit (MLTU), according to some embodiments of the present invention.
Figure 11B:
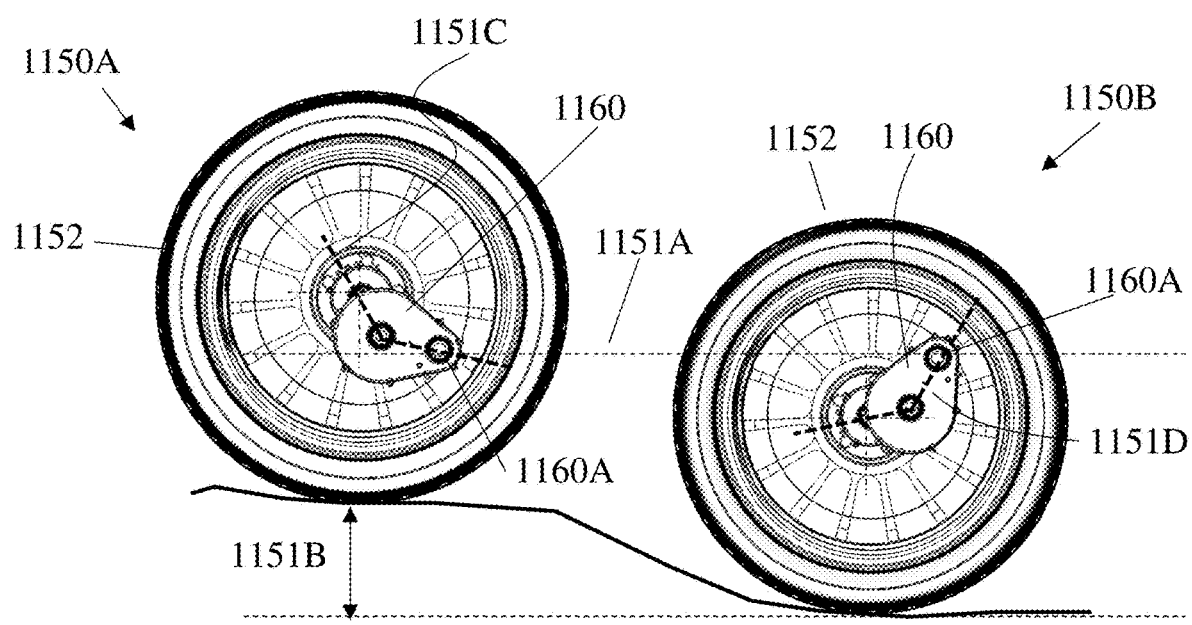

Reference is made now to FIGS. 11A and 11B, which are schematic illustrations of an in-wheel multi-link transmission units (MLTU) 1103 and 1160, respectively, according to some embodiments of the present invention. MLTU 1103 in FIG. 11A may comprise two or more transmission links, adapted to transfer rotational power from a power input 1103A to a power output 1103B. Power input 1103A may be a motor, a gear or the like. Power output 1003B may be connected to a wheel, adapted to drive the wheel. MLTU 1103 may provide flexibility and freedom of movement between the power input 1103A and the wheel. In some embodiments, MTU 1103 may be comprised, partially or fully, within the wheel rim, thereby enabling efficient occupation of an installation space. FIG. 11A illustrates wheel 1102 in two positions: a lower position 1100A on the left side and at a higher position 1100B on the right side. The vertical displacement of wheel 1102, 1101B, exemplifies the vertical freedom of movement of wheel 1102, while power input 1103A remains at the same level 1101A. FIG. 11B depicts MLTU 1160, that similarly to MLTU 1103, provides freedom of movement of wheel 1152, powered by MLTU 1160. Rotational power is provided at 1160A. Wheel 1152 is shown in its higher position 1150A on the left side and in its lower position 1150B on the right side. The vertical displacement of wheel 1152, 1151B is enabled due to freedom of movement between power input 1160A and the axis of wheel 1152. As depicted in FIG. 11B, power input 1160A remains at the same level 1151A when wheel 1152 moves vertically. In some embodiments, MLTU 1103 or 1160 may be embodied similarly, for example, to MLAG 850, 86 or 870 of FIG. 8A, 8B or 8C, respectively.

Figure 12:
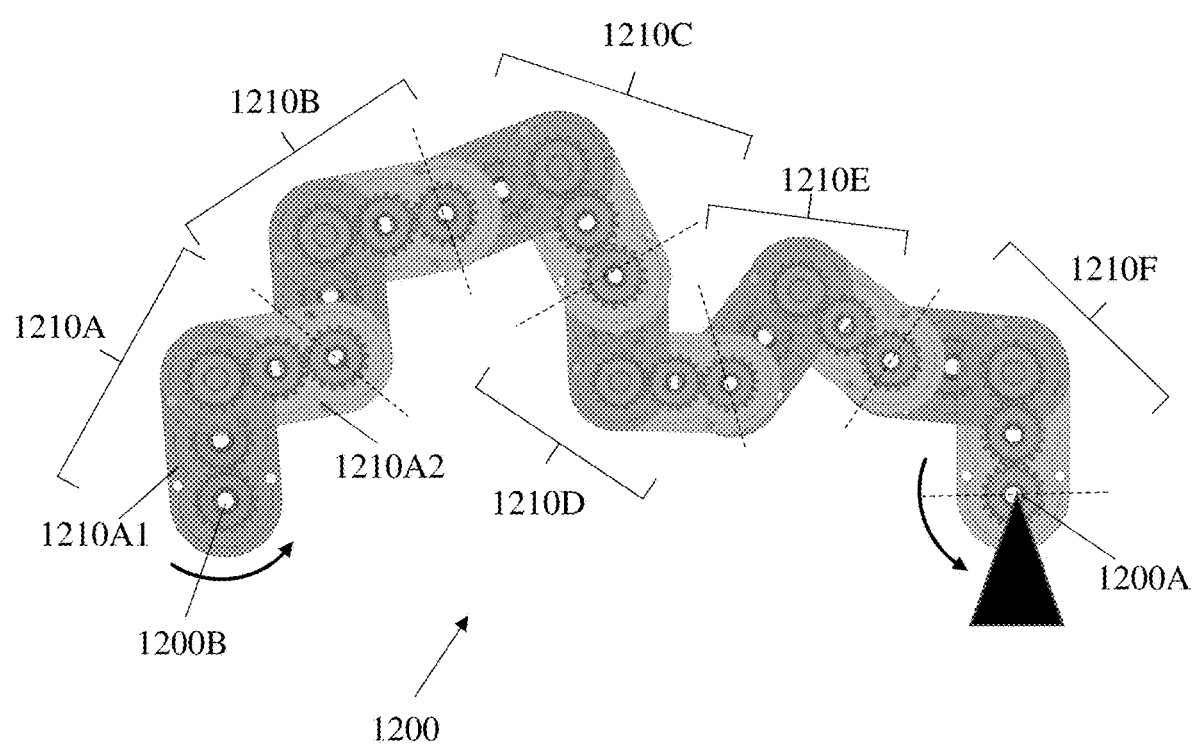
FIG. 12 is a schematic illustration of a transmission assembly comprising plurality of MLTUs, according to some embodiments of the present invention.

Reference is made now to FIG. 12, which is a schematic illustration of a transmission assembly (TA) 1200 comprising plurality of MLAGs, according to some embodiments of the present invention. TA 1200 may comprise plurality of MLAGs 1210A, 1210B . . . 1210F, connected in a daisy chain to each other, so as to enable transmission of rotational power from an input 1200A to an output 1200B. Each MLAG (e.g., 1210A, 1210B, etc.) may comprise at least two L-MLAGs, as described above with regard to FIGS. 3 and 4. TA 1200 may provide extreme flexibility in transferring rotational power from input 1200A, which may be, for example, a stationary point, to output 1200B, which has a freedom of movement to move a virtually any point encircled by an imaginary circle having a radius equal to the length of TA 1200 when fully extended.

Figure 13:
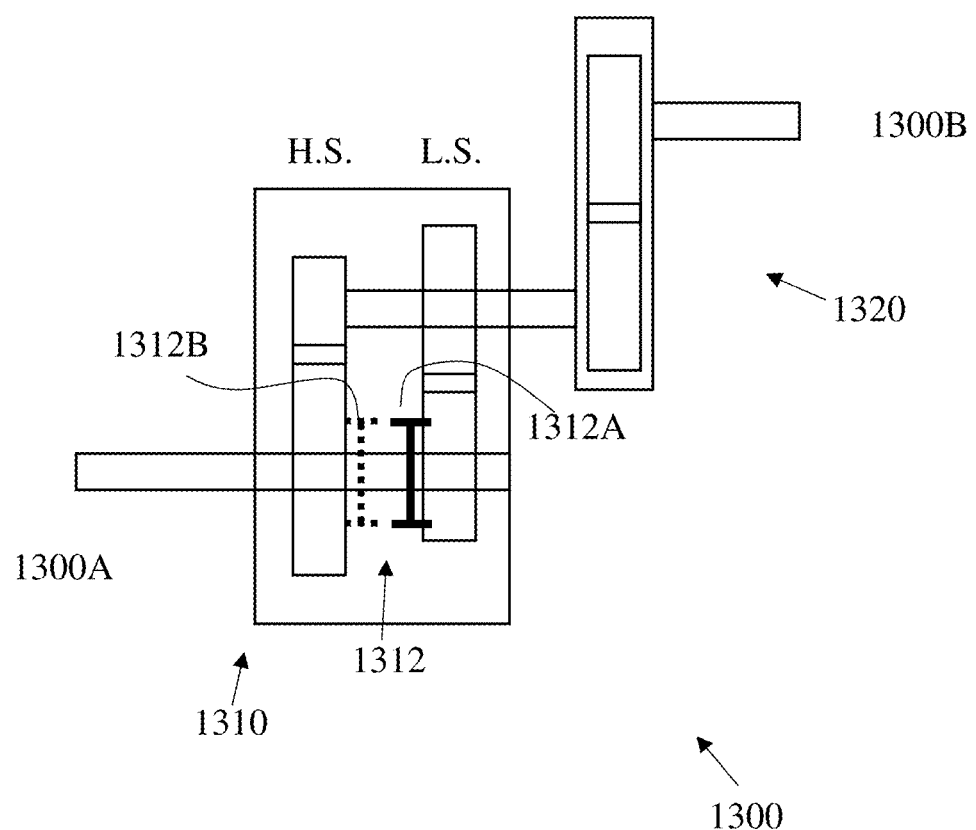
FIG. 13 is a schematic illustration of a transmission assembly (TA) comprising multi-gear unit and multi-link transmission, according to some embodiments of the present invention.

Reference is made now to FIG. 13, which is a schematic illustration of transmission assembly (TA) 1300 comprising multi-gear unit 1310 and MLTU 1320, according to some embodiments of the present invention. According to some embodiments of the present invention, a transmission adapted to transfer rotational power may have both the flexibility of selecting transmission gear ratio and freedom of movement of the output shaft with respect to the input of TA 1300. TA 1300 may comprise a multi-ratio gear box 1310, which may be adapted to provide at least two different rotation transmission ratios. Gear 1310 schematically presents two different transmission ratios, corresponding to high-speed (H.S.) and low speed (L.S.), which may be achieved by a selector 1312, which in its 1312A position selects L.S. ratio and in its 1312B selects H.S. ration, as is known in the art. MLTU 1320 may provide freedom of movement of output 1300B with respect to input 1300A, as discussed above.

Figure 14:
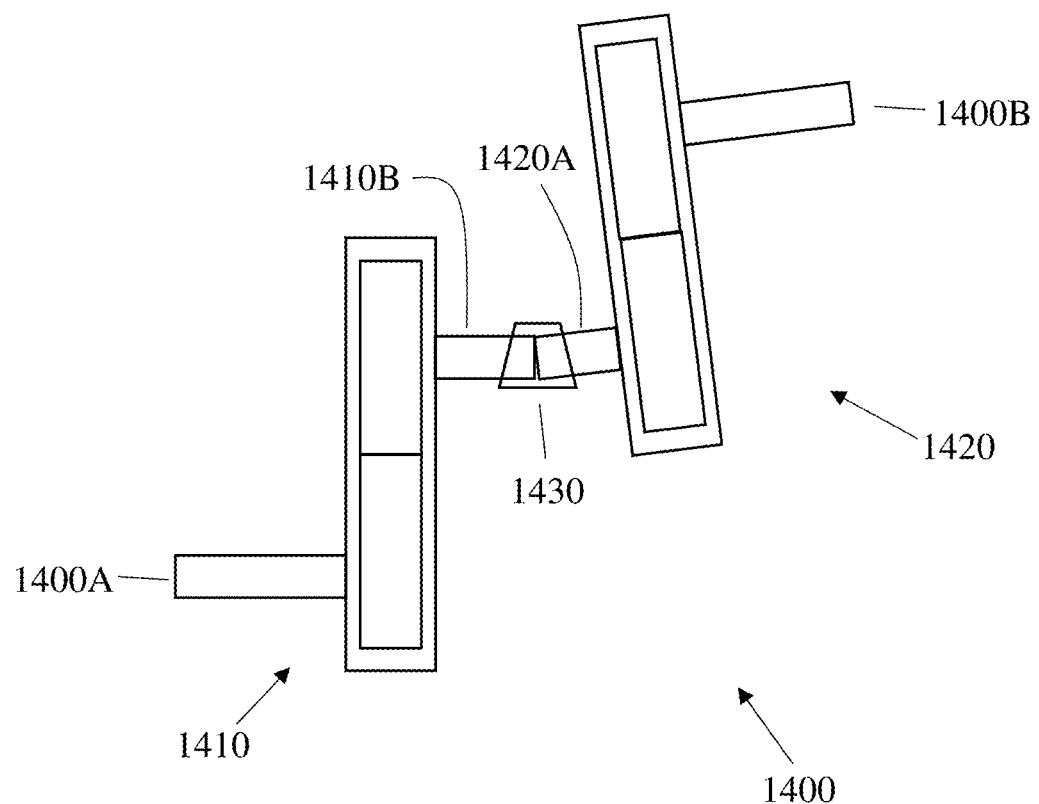
FIG. 14 is a schematic illustration of a transmission comprising two MLTUs in an angled connection between them, according to some embodiments of the present invention.

Reference is made now to FIG. 14, which is a schematic illustration of transmission 1400 comprising two MLTUs, 1410 and 1420 respectively, in an angled connection between them, according to some embodiments of the present invention. power input to transmission 1400 is 1400A and its output is 1400B. Each MLTU, 1410 and 1420, provides freedom of movement of its input shaft with respect to its output shaft, as discussed above. Further, output 1410B of MLTU 1410 may be connected to power input 1420A of MLTU 1420 via and angled connection, or angle gearbox 1430, that enables transmission of rotational power through an angled connection. Accordingly, output 1400B of MLTU 1420 in angle with respect to power input 1400A of MLTU 1410. This embodiment may provide solution when transmission of rotational power is required with both freedom of movement of the output with respect to the input, and inclination of the line of input axis with respect to the output axis.

Figure 15:
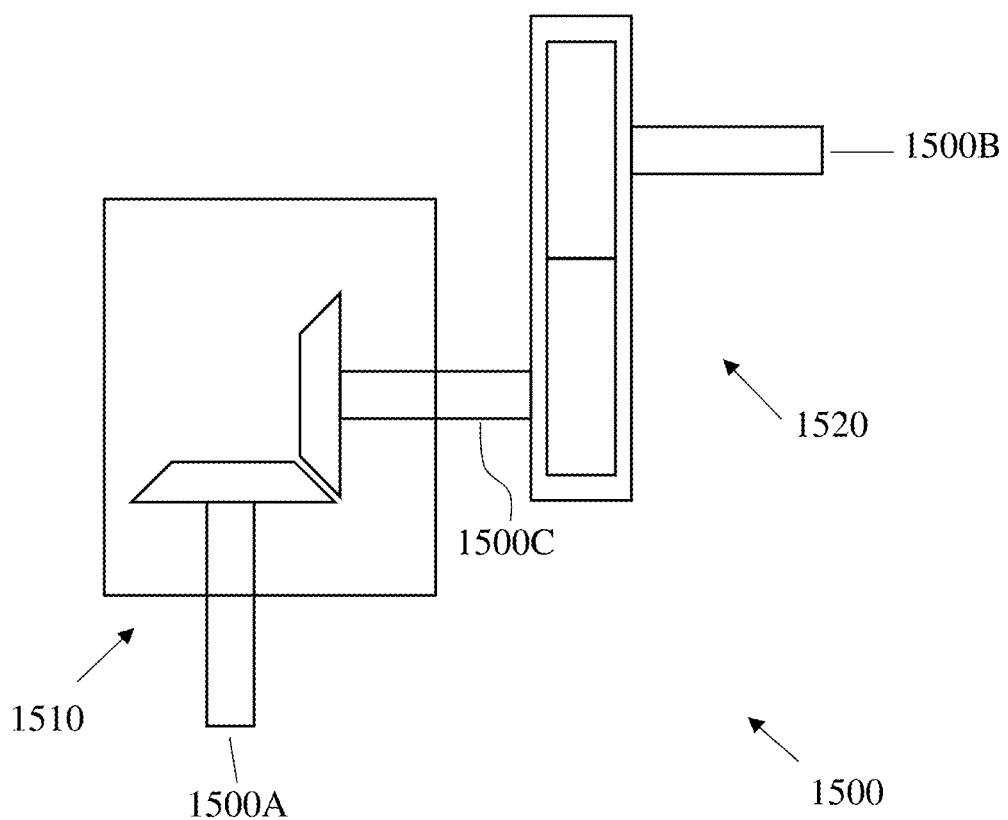
FIG. 15 is a schematic illustration of a transmission comprising a straight-angle gearbox and a MLTU, according to some embodiments of the present invention.

Reference is made now to FIG. 15, which is a schematic illustration of transmission 1500 comprising a straight-angle gearbox 1510 and a MLTU 1520, according to some embodiments of the present invention. Gearbox 1510 may be a straight-angle gearbox, as is known in the art. Input 1500A of gearbox 1510 may be disposed in a substantially right angle with respect to output 1500C. output 1500C may be the input shaft to MLTU 1520. Accordingly, and as discussed above, output 1500B may have a freedom of movement with respect to 1500C. thereby, transmission 1500 may provide solution for transferring rotational power where the output needs to be disposed in a right angle with respect to the input and should further have freedom of movement with respect to the input.

Transmissions that were discussed above may be used in various applications. In one embodiment, a transmission according to some embodiments of the invention may be used to drive rollers of a production line or a printing machine, where the distance between the axes of the rollers should be controllable, e.g., for setting a required registration of the printing, and the relative rotation speed should be firmly related between the rollers. In another embodiment, a driving transmission according to some embodiments of the invention may be used to enable, in a testing or development line, easy and flexible setting of the distance between axes of two (or more) rotating equipment that are driven by a common drive.

Assuming $T_{in}$ is the input torque to the transmission box at the shaft of the input gear, and $T_{react-out}$ is the reaction torque at the last gear of the transmission box. The transmission box is held in place by a fixture ($T_{fixture}$) to a reference system (the ground for example), hence, it is defined that the transmission box is static in relation to the reference system.

According to Newton's laws of motion, conducting a summation of moments about a point in the system (the system is defined as the transmission box as a whole) we get, by definition, a total of zero ($\Sigma M=0$). Provided the above, let us break down to two cases:

CASE #1—The transmission has an even number of gears with a transmission ratio of 1:n.

Defining $T_{in}$ is CCW, for even number of gears, $T_{react-out}$ will be CCW.

Because the transmission ratio is 1:n, $|T_{in}|=n \cdot |T_{react-out}|$

When summing moments around the fixture, we get: $\Sigma M=T_{in}+T_{react-out}+T_{fixture}=0$ Further developing, we can find that $T_{fixture}=(1+n) \cdot T_{in}$ For a case with 1:1 transmission on ratio, $T_{fixture}=2 \cdot T_{in}$ CASE #2—The transmission has an odd number of gears with a transmission ratio of 1:n.

Defining $T_{in}$ is CCW, for odd number of gears, $T_{react-out}$ will be CW.

Because the transmission ratio is 1:n, $|T_{in}|=n \cdot |T_{react-out}|$

Figure 16A:
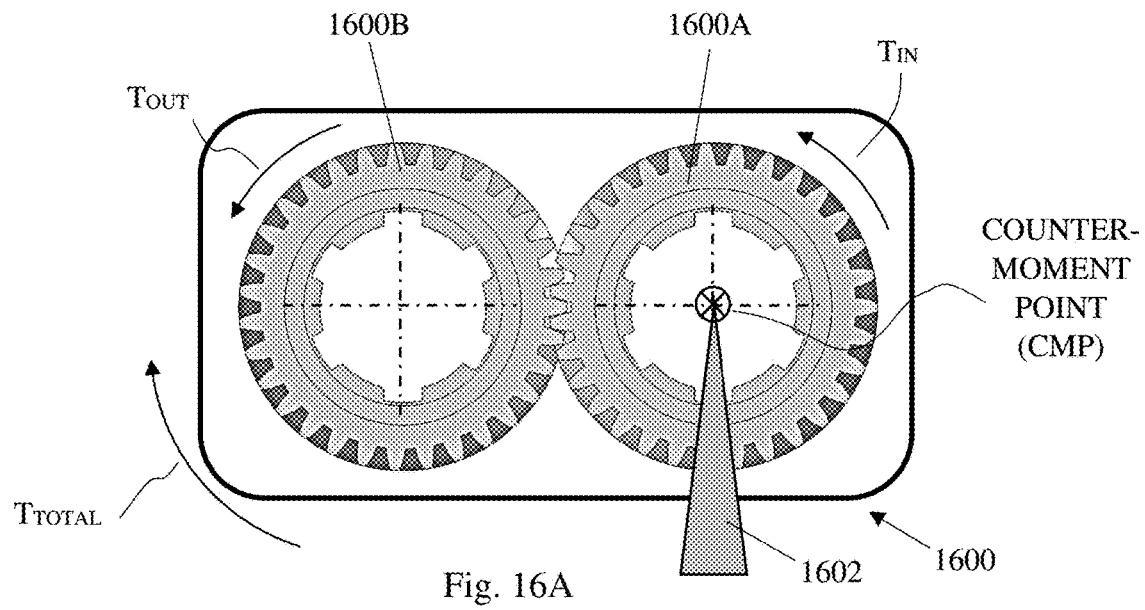
FIGS. 16A-16D depict various multi-gear-wheel transmission and respective calculation of torques and moments of same, according to some embodiments of the present invention.

When summing moments around the fixture, we get:
$\Sigma M = T_{in} - T_{react-out} + T_{fixture} = 0$ Further developing, we can find that $T_{fixture} = (1-n) \cdot T_{in}$ For a case with 1:1 transmission ratio, $T_{fixture} = 0$ Turning now from a general discussion of torques calculations to transmission gears that are used for transferring rotational power from a rotational source that is attached to a reference frame, to a rotating equipment that is free to move with respect to the reference frame, may experience undesired movements due to torque transferred by the transmission box. Reference is made to FIG. 16A, which is a schematic illustration of transmission box 1600. Transmission box (TB) 1600 may be pivotally attached to a reference frame via stationary point 1602. TB 1660 comprises two gears, 1600A and 1600B, meshed with each other. When torque $T_{IN}$ is provided to input gears 1600A, output gears 1600B transfers torque $T_{OUT}$. The total torque $T_{TOTAL}$ that TB 1600 experiences may be presented as: $T_{TOTAL} = T_{IN} + T_{OUT} \neq 0$, which is an undesired result in many embodiments.

Figure 16B:
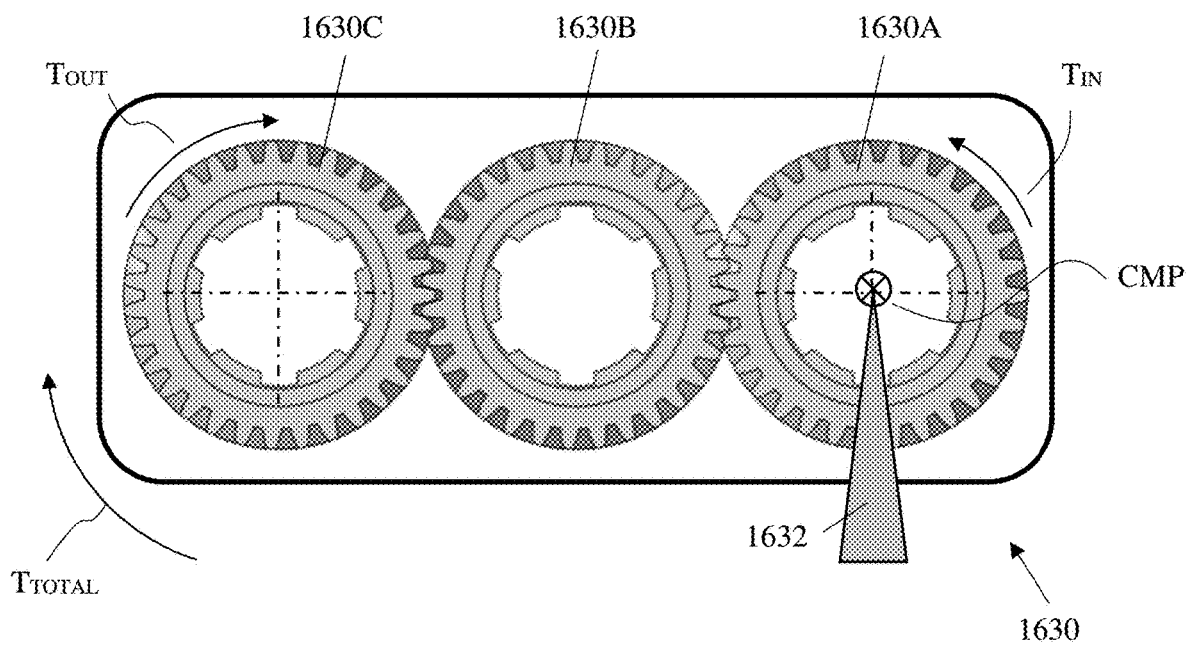

Reference is made now to FIG. 16B, which is a schematic illustration of transmission box 1630, according to some embodiments of the present invention. Transmission box (TB) 1630 includes 3 gears, 1630A meshed with gears 1630B and gears 1630B meshed with gears 1630C. Transmission box (TB) 1630 may be pivotally attached to a reference frame via stationary point 1632. Similar to the torques calculation made above with respect to TB 1660 of FIG. 16A, when torque $T_{IN}$ is provided to input gear wheel 1630A, output gear 1630C transfers torque $T_{OUT}$. The total torque $T_{TOTAL}$ that TB 1630 experiences may be presented as: $T_{TOTAL} = T_{IN} - T_{OUT}$. When the transmission ratio is 1:1, $T_{IN} = T_{OUT}$ and accordingly $T_{TOTAL} = 0$. Hence, TB 1630, which comprises three gear wheels in a row, is adapted to transfer rotational power from an input gear wheel to the output gear while the transmission box itself experiences virtually no torque with respect to the reference frame.

In some embodiments, one or more vibration sensors may be placed in predetermined locations in or on the outer face of the transmission, for sensing and transmitting signals reflecting vibrations of the transmission. Educated selection of the locations for installing the sensors, and reliance on pre-acquired profiles of similar transmissions may assist in obtaining early warning of required maintenance operation. When one or more signals form the sensors represent vibration that go out of a range that is considered 'healthy operation' range, either exceeding magnitude, frequency or temperature, the sensor signals may be processed in order to deduce whether or not immediate or close maintenance is required.

In some embodiments, gears and transmissions that were described above may further comprise lubrication system, heat dissipation system, mechanical connection(s) and reinforcement means, as may be required and dictated by the specific intended use.

In some embodiments, one or more rotational speed control means, such as speed reduction/increasing gears, multi-ratio gears and the like may be integrated with one or more MLTUs, to provide a rotational power transmission solution with a multi-speed with freedom of movement between input and output axes.

Transmission gears of the types that are described above may respond to torque/moment that is transferred through them by developing counter torque acting around the power input axis. There is a need to restrain or even eliminate such counter torques. For example, when a transmission gear has two or more gear wheels arranged as described above and has the output shaft remote from the input shaft, the entire gearbox will tend to rotate about the input shaft when rotational power is transferred through the gearbox in a rotational direction opposite to the rotational direction of the input power. This may interfere with the desired way of operation of the powered device.

Reference is made to FIGS. 16A-16D, which depict various multi-gear-wheel transmissions 1600, 1630, 1650 and 1680, respectively, and respective calculation of torques and moments of same, according to embodiments of the present invention. Multi-gear-wheel transmission (MGWT) 1600 of FIG. 16A comprises two gear wheels 1600A that are powered through its shaft and output gear wheel 1600B that is powered by gear wheel 1600A. Torques that are operative when rotational power is provided to the shaft of wheel 1600A are: $T_{IN}$ is the torque that gear wheel 1600A provides to gear wheel 1600B; and $T_{OUT}$ is the torque that gear wheel 1600B provides to the output shaft of MGWT 1600. The magnitude of $T_{TOTAL}$ is the algebraic sum of $T_{IN}$ and $T_{OUT}$. As is evident, when torque is transferred through MGWT 1600 the following yields:

$$T_{TOTAL} = T_{IN} + T_{OUT} \neq 0$$

In embodiments where response torque is undesired, means should be taken to make $T_{TOTAL}$ equal to zero. Hence, transferring pure torque through the gears and not causing the L-MLAG to actuate undesirably.

Reference is made now to Multi-gear-wheel transmission (MGWT) 1630 of FIG. 16B, built and operative according to some embodiments of the present invention. MGWT 1630 comprises three gear wheels 1630A, 1630B and 1630C. Torque may be provided to the shaft of gear 1630A and may be transferred out via the shaft of gear wheel 1630C. The torque from gear 1630A is transferred to gear 1630C via gear wheel 1630B. Torques that are operative when rotational power is provided to the shaft of wheel 1630A are: $T_{IN}$ is the torque that gear 1600A provides to gear wheel 1600B; $T_{OUT}$ is the torque that gear wheel 1600B provides to the output shaft of MGWT 1600; and $T_{TOTAL}$ is the response torque of MGWT 1600 when it transfers torque from its input shaft to its output shaft. The magnitude of $T_{TOTAL}$ is the algebraic sum of $T_{IN}$ and $T_{OUT}$. As is evident, when torque is transferred through MGWT 1600 the following yields:

$$T_{TOTAL} = T_{IN} - T_{OUT} = 0 \text{ when } T_{IN} = T_{OUT}, \text{ e.g. for transmission ratio of 1:1}$$

which is a desired result.

Figure 16C:
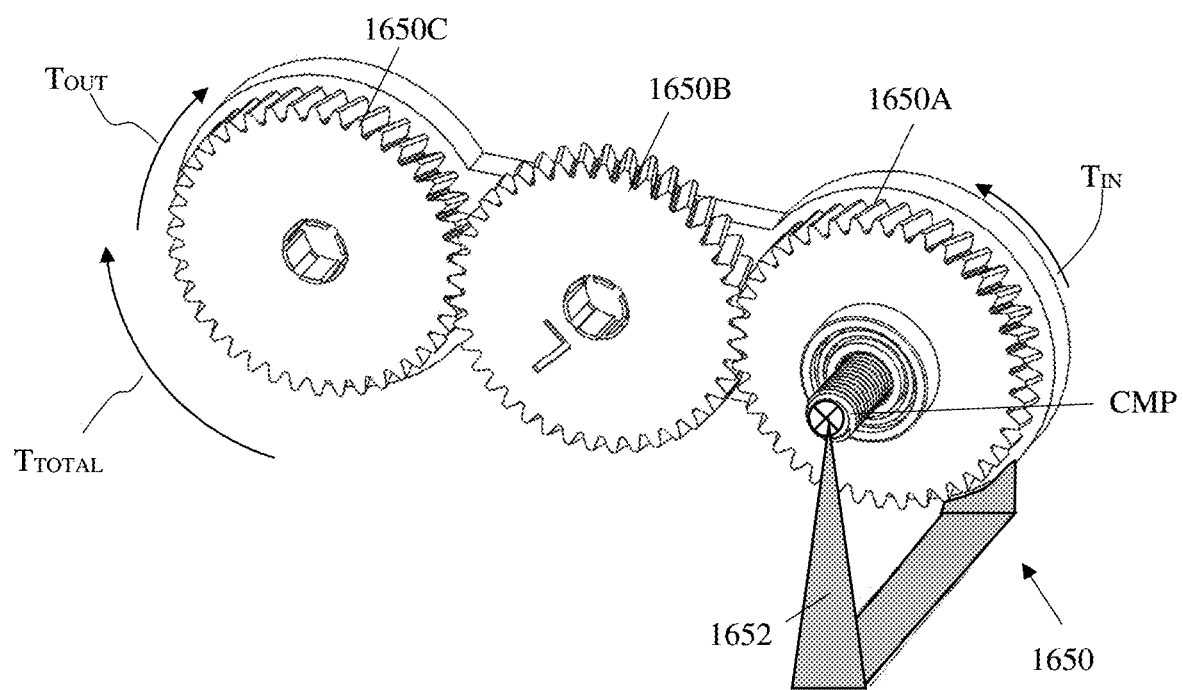

Reference is made now also to Multi-gear-wheel transmission (MGWT) 1650 of FIG. 16C, which is an isometric view of a MGWT of FIG. 16B, according to some embodiments of the present invention. MGWT 1650 comprises three gear wheels 1650A, 1630B and 1650C. Torque may be provided to the shaft of gear wheel 1650A and may be transferred out via the shaft of gear wheel 1650C. The torque from gear wheel 1650A is transferred to gear wheel 1650C via gear wheel 1650B similarly to the torque calculation of MGWT 1600B here also applies:

$$T_{TOTAL} = T_{IN} - T_{OUT} = 0 \text{ when } T_{IN} = T_{OUT}, \text{ e.g. for transmission ratio of 1:1.}$$

Figure 16D:
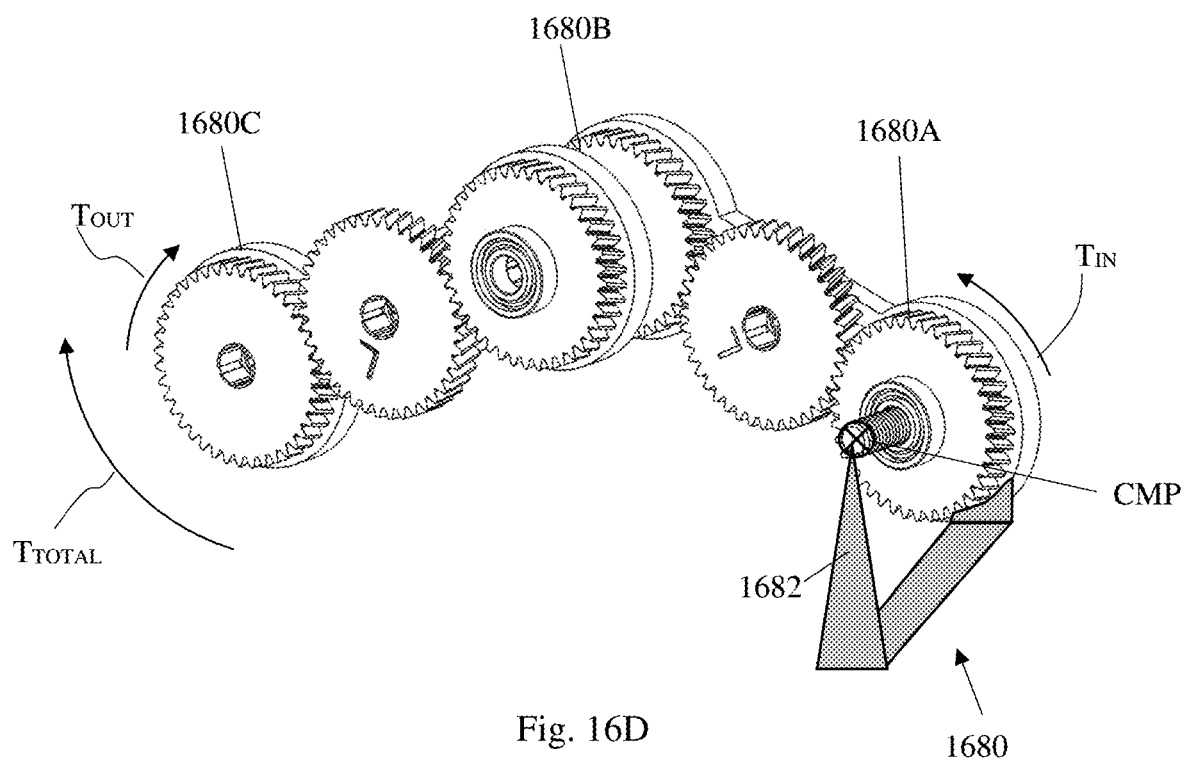

Reference is made now also to Multi-gear-wheel transmission (MGWT) 1680 of FIG. 16D, which is an isometric view of a two-links MGWT according to some embodiments of the present invention. MGWT 1680 may be described as comprising two units of MGWT 1650, that is the first part of MGWT 1680, named MGWT 1680(1) receives torque via the shaft of gear wheel 1680A and transfers torque via the shaft of gear wheel 1680C. The second part, named MGWT 1680(2), received torque from the shaft of gear wheel 1680C, which is also the shaft of gear wheel 1680A', the torque input to MGWT 1680(2). Similarly to the torques calculations made above with regards to MGWT 1630 and MGWT 1650, here applies:

$$T_{TOTAL(1)}=T_{IN}-T_{OUT(1)}=0 \text{ when transmission ratio(1) is 1:1}$$

$$T_{TOTAL(2)}=T_{IN(2)}-T_{OUT}=0 \text{ when transmission ratio(2) is 1:1}$$

Hence:

$$T_{TOTAL}=T_{TOTAL(1)}+T_{TOTAL(2)}=0 \text{ when transmission ratios (1) and (2) are 1:1}$$

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A multi-link transmission gear for transmitting a rotational power from an input shaft to an output shaft, the rotational power is provided to the input shaft by a rotational power source, the multi-link transmission gear comprising:
a first link comprising a first gear and a second gear, wherein the first gear of the first link is rotatably supported by the first link and is adapted to be powered by the input shaft, and wherein the second gear of the first link is rotatably supported by the first link and is adapted to receive a rotational movement from the first gear of the first link;
a second link comprising a first gear and a second gear, wherein the first gear of the second link is rotatably supported by the second link and is rotatable by the first gear of the first link, and wherein the second gear of the second link is rotatably supported by the second link and is rotatable by the first gear of the second link to provide the rotational power to the output shaft;
wherein the first link and the second link have a common axis adapted to allow the first link and the second link to rotate freely about the common axis and thus to allow a change of an angle between the first link and the second link and thereby to change a distance between the input shaft and the output shaft; and
at least one additional link, each of the at least one additional link comprising:
a first gear and a second gear,
wherein the first gear of each of the at least one additional link is adapted to be rotated by a second gear of one of one or more neighbor links, and
wherein each of the at least one additional link is adapted to rotate about a common axis with one of the one or more neighbor links.

2. The transmission gear of claim 1, wherein the gears of at least one of: the first link, the second link and the at least one additional link and the gears of a link neighboring thereto, are positioned in a substantially the same plane.

3. The transmission gear of claim 1, wherein the gears of at least one of: the first link, the second link and the at least one additional link are positioned in a plane that is substantially parallel to a plane of the gears of a link neighboring thereto and displaced from it.

4. The transmission gear of claim 1, wherein the second gear of at least one of: the first link, the second link and the at least one additional link is the first gear of a link neighboring thereto.

5. The transmission gear of claim 1, wherein at least one of: the first link, the second link and the at least one additional link comprises at least one additional gear positioned between the first gear and the second gear of the respective link and is adapted to transfer the rotational power from the first gear to the second gear of the respective link.

6. The transmission gear of claim 1, wherein the second gear of at least one of: the first link, the second link and the at least one additional link, and the first gear of a link neighboring thereto, are configured to rotate together on a common axis.

7. A wheel driving mechanism comprising:
a transmission gear according to claim 1;
a rotational power source coupled to the first gear of the first articulated link;
a first wheel coupled to the second gear of the second articulated link;
a second wheel coupled to the second gear of a third articulated link; and
a suspension mechanism coupled between the first articulated link and the second articulated link and between the first articulated link and the third articulated link to provide suspension between the rotational power source and the first and the second wheels.

8. The transmission gear of claim 1, wherein at least one of: the first link, the second link and the at least one additional link comprises an odd number of gears.

9. The transmission of claim 1, wherein the first gear and the second gear of at least one of: the first link, the second link and the at least one additional link are shaped and sized to have a transmission ratio of 1:1 between the first gear and the second gear of the respective link.

10. The transmission gear of claim 1, wherein the first gear and the second gear of the at least one of: the first link, the second link and the at least one additional link are shaped and sized to reduce a rotational speed of the second gear with respect to a rotational speed of the first gear of the respective link.

* * * * *